United States Patent [19]

Petrov et al.

[11] 3,772,532

[45] Nov. 13, 1973

[54] APPARATUS FOR SIMULTANEOUS TRIGGERING OF SERIES-CONNECTED THYRISTORS

[76] Inventors: Jury Ivanovich Petrov, ulitsa Omskaya, 13, kv. 60; Boris Alexandrovich Budilov, 2 Murinsky prospekt, 3, kv. 30; Anatoly Danilovich Zaitsev, Grazhdansky prospekt, 31, korpus 3, kv. 47, all of Leningrad, U.S.S.R.

[22] Filed: Aug. 4, 1972

[21] Appl. No.: 278,121

Related U.S. Application Data

[63] Continuation of Ser. No. 107,711, Jan. 19, 1971, abandoned.

[30] Foreign Application Priority Data

Jan. 26, 1970 USSR ........................... 1394698

[52] U.S. Cl. ............................ 306/252 L, 307/268

[51] Int. Cl. .......................................... H03k 17/72

[58] Field of Search .................... 307/252 K, 252 L, 307/252 W, 252 J, 268

[56] References Cited

UNITED STATES PATENTS

| | | | |
|---|---|---|---|
| 3,267,290 | 8/1966 | Diebold | 307/252 L |
| 3,573,484 | 4/1971 | Engroff | 307/252 L |
| 3,599,075 | 8/1971 | Etter et al. | 307/252 L |

*Primary Examiner*—John Zazworsky
*Attorney*—Holman & Stern

[57] ABSTRACT

In an apparatus for simultaneous triggering of series-connected thyristors using pulse transformers, the primary windings of the pulse transformers are series-connected via blocking capacitors and in parallel with series-connected thyristors. The secondary windings of the same transformers are connected between the gate and cathode of the respective thyristors. One end of the network formed by the primary windings of the transformers is connected to the common anode of the group of thyristors, while the other end terminates in a control switch operating at the recurrence frequency of the signal triggering the thyristors.

3 Claims, 3 Drawing Figures

APPARATUS FOR SIMULTANEOUS TRIGGERING OF SERIES-CONNECTED THYRISTORS

This is a Continuation of application Ser. No. 107711, filed Jan. 19, 1971, and now abandoned.

The present invention relates to an improvement in an apparatus for simultaneous triggering of series-connected thyristors and may be used, for example, in H.T. pulse modulators and oscillators.

In the prior art, there is an apparatus for simultaneous triggering of series-connected thyristors, utilizing energy furnished by an auxiliary trigger-signal source and applied to the gates of the thyristors by pulse transformers.

In this prior-art apparatus, the primary windings of the transformers are connected in series via blocking capacitors. Each network formed by the primary winding of the transformer and its, blocking capacitor is connected via a resistor in parallel with the respective thyristor. The secondary windings of the pulse transformers are connected via dropping resistors between the gate and cathode of the respective thyristors and by-passed by diodes. The positive side of the trigger-signal source is connected to the center tap of the network formed by the primary windings of the transformers, and the negative side of the same trigger-signal source is connected via additional blocking capacitors to the extreme points of the same network.

A major disadvantage of this prior-art apparatus is the need to use a trigger-signal source with a power output many times the power required to trigger a single thyristor, and has to be further increased with increasing number of series-connected thyristors.

Another disadvantage is the need to provide H.T. isolation between the series-connected thyristors and the trigger-signal source.

A further disadvantage is that some of the thyristors operate under adverse conditions for the reason that the discharge current of the blocking capacitors induces negative pulses in the gates of these thyristors.

It is an object of the present invention to provide an apparatus for simultaneous triggering of series-connected thyristors, using trigger signals of a power which is considerably smaller than that of the prior-art apparatus and which is independent of the number of thyristors to be triggered.

Another object of the present invention is to ensure optimum operating conditions for all the thyristors.

With these and other objects in view, the present invention resides in an apparatus for simultaneous triggering of series-connected thyristors, comprising as many pulse transformers as there are thyristors, the secondary windings of which are connected between the gate and cathode of the respective thyristors, and the primary windings are connected in series via blocking capacitors into a network one end of which is connected to the common anode of a group of thyristors and in parallel with that group, in which according to the invention, the other end of the network formed by the primary windings of the transformers and the blocking capacitors terminates in a controlled switch operating at the recurrence frequency of the thyristor-triggering signals and arranged so that the voltage drop across the switch when it is in OFF state is not less than the total voltage applied to the network of the primary windings of the transformer to induce in the secondaries current pulses sufficient to trigger the thyristors.

With this arrangement of the pulse-transformer primaries, the thyristors are triggered by the charging current of the blocking capacitors, produced by a redistribution of potential in the trigger circuit when the switch changes to the ON (conducting) state, which fact makes the power of the trigger-signal source independent of the number of series-connected thyristors, reduces the required power of the trigger-pulse source, creates optimum conditions for operation of all thyristors and makes unnecessary any H.T. isolation between the series-connected thyristors and the trigger-signal source.

The controlled switch referred to may be built around an H.T. transistor whose collector is connected to the primary winding of a transformer, whose emitter is earthed, and the base circuit of which accepts trigger pulses which drive the switch transistor into conduction, while connected in parallel with the transistor is a resistor bypassed by a series RC-network, and the blocking capacitors are bypassed by resistors.

As an alternative, the controlled switch may be built around a thyristor whose anode is connected to the primary winding of a transformer, whose cathode is earthed, and the gate of which accepts trigger signal driving the switch thyristor into conduction, while connected in parallel with the thyristor is a resistor by-passed by a series RC-network, and the blocking capacitors are by-passed by resistors.

The invention will be more fully understood from the following description of a preferred embodiment when read in connection with the accompanying drawings, wherein:

FIG. I is a circuit schematic diagram of an apparatus of the present invention for simultaneous triggering of series-connected thyristors;

Figures 1, 2, 3:
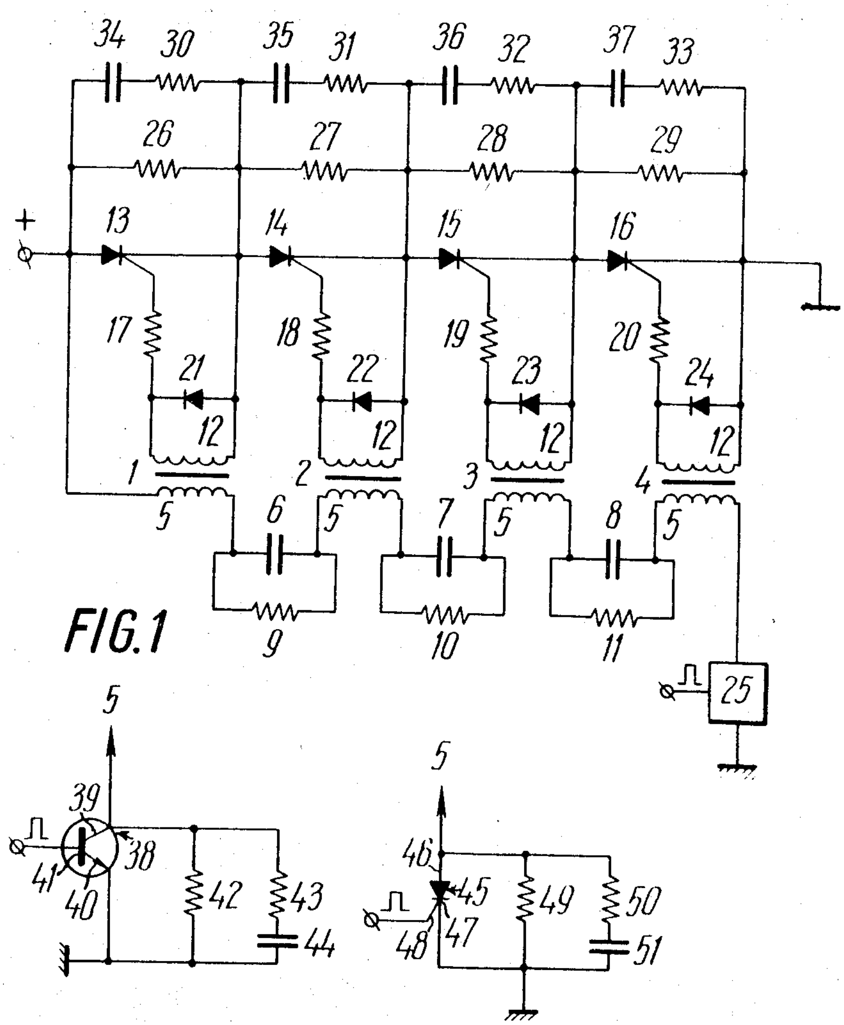
FIG. 2 shows connection of a transistor used as the controlled element of a switch.
FIG. 3 shows connection of a thyristor used as the controlled element of a switch.

Referring to FIG. I, there is an apparatus for the simultaneous triggering of series-connected thyristors, comprising pulse transformers I, 2, 3, and 4, the primary windings 5 of which are connected in series via blocking capacitors 6, 7, and 8 bypassed by resistors 9, IO, and II. The secondary winding I2 of the transformers I through 4 are connected each between the cathode and gate one of the series-connected thyristors I3, 14, I5, and I6, respectively. Connected in series with the secondary windings I2 of the transformers I through 4 are resistors I7, I8, I9, and 20. The windings I2 are bypassed by diodes 2I, 22, 23, and 24. At one of its ends the network of the primary windings 5 of the transformers is connected to the anode of the thyristor I3 which is, in this case, the common anode for the group of thyristors I3 through I6.

The other end of this network terminates in a control switch 25 operating at the recurrence frequency of the signals triggering the thyristors 13 through 16 and coming from an external source (not shown in the diagram). This switch 25 is arranged so that in its "off" state, it has a sufficiently high resistance and in its "on" state it has a sufficiently low resistance, as a result of which, voltage drops at the switch 25 when it is switched on, and the potential is redistributed in the triggering circuit and the voltage rises across the capacitors 6, 7 and 8, causing the charging current of the capacitors 6, 7 and 8 to flow in the primary winding 5 of the transformers 1, 2, 3 and 4. This induces in the secondary winding 12 of the transformers 1, 2, 3 and 4 current pulses which are supplied to the gate of the thyristors 13, 14,15 and 16 and puts the thyristors in an open state simultaneously.

The controlled element of the switch referred to may be a relay, a vacuum valve, a transistor, or a thyristor. If a semiconductor device is used as this controlled element of the switch, it is preferable to bypass the blocking capacitors 6 through 8 with resistors 9 through II (as shown in FIG.I).

The transformers I through 4, the blocking capacitors 6 through 8, the bypass and dropping resistors 9 through II and I7 through 20, the diodes 2I through 24, and the switch 25 form the trigger circuit.

To improve the operating conditions for the thyristors I3 through I6 and to enhance the reliability of the apparatus disclosed herein as a whole, it may be extended to incorporate a steady-state voltage divider made up by resistors 26 through 29 connected in parallel with each thyristor I3 through I6 respectively, and a reconvery-voltage divider made up by the RC-networks connected in parallel with each thyristor I3 through I6 and respectively comprising resistors 30 through 33 and capacitors 34 through 37.

Connection of an H.T. transistor 38 of the n-p-n type as the controlled element of the switch is shown in FIG.2.

The collector 39 of the transistor 38 is connected to the primary winding 5 of the transformer 4, the emitter 40 is earthed, and the base 4I is connected to an external trigger-signal source. Connected in parallel with the transistor 38 is a resistor 42 bypassed by a series RC-network consisting of a resistor 43 and a capacitor 44. Thus, the controlled switch comprises a combination of a transistor, a resistor and an RC-network.

Connection of a thyristor 45 as the controlled element of a switch is shown in FIG.3.

The anode 46 of the thyristor 45 is connected to the primary winding 5 of the transformer 4, the cathode is earthed, and the gate 48 is connected to an external trigger-signal source. Connected in parallel with the thyristor 45 is a resistor 49 bypassed by a series RC-network comprising a resistor 50 and a capacitor 5I. Thus, the switch is formed by a combination of a thyristor, a resistor, and an RC-network.

Consider operation of the apparatus disclosed herein when the controlled element of the switch is the thyristor 38.

Originally, the trigger circuit is at a potential equal to that at the anode of the thyristor I3. The voltage applied to the trigger circuit (equal to the voltage across the series-connected thyristors I3 through I6) is partitioned between the capacitors 6 through 8 and 5I in proportion to the resistances of their bypass resistors 9 – II and 49. The voltage across the thyristor 45 is determined by the resistance of the resistor 49. When a trigger pulse is applied to the gate 48 of the thyristor 45, the latter jumps into the ON state, that is, to a high-conductance state. The capacitor 5I begins to discharge through the thyristor 45 and the dropping resistor 50. Just as this happens, the potential of the trigger circuit is re-distributed so that the capacitors 6 through 8 come by a higher potential. This potential re-distribution gives rise to a current in the trigger circuit, which charges the capacitors 6 through 8 and, on traversing the primary windings 5 of the pulse transformers I through 4, induces in their secondary windings I2 current pulses which are simultaneous applied to the gates of the thyristors I3 through I6 and drive them to the ON (conducting) state.

Since the trigger signal has to actuate only one switch, the power of the trigger-signal source may be only a small fraction of that of the prior-art apparatus; and since no power current traverses the switch, its controlled element may be one with a low current rating.

What is claimed is:

1. An apparatus for simultaneous triggering of a plurality of series-connected thyristors, comprising in combination: a plurality of series-connected thyristors forming an anode-end terminal and a cathode-end terminal, and as many pulse transformers as there are thyristors, each of said pulse transformers having a primary winding, and a secondary winding connected between the cathode and the gate of a respective thyristor; blocking capacitors connected between said primary windings of said pulse transformers; a control switch means having an anode terminal, a cathode terminal and a controlled input terminal, said primary windings of said pulse transformers and the interposed blocking capacitors being connected to form a continuous series circuit, one end of which is connected to said anode-end terminal of said series-connected thyristors and the other end is connected to said anode-terminal of said switch means whose cathode terminal is connected to said cathode-terminal of said series-connected thyristors.

2. An apparatus as claimed in claim 1, in which, said control switch means comprises a transistor, one of whose main electrodes, i.e., a collector, is connected to said anode terminal of said switch means, the other main electrode, or emitter, is connected to said cathode terminal of said switch means and earthed, and the base of said transistor is connected to said control input terminal of said switch means, said transistor being connected in parallel with a resistor which is shunted by a series-RC circuit, said blocking capacitors between said primary windings of the pulse transformers being shunted by resistors.

3. An apparatus as claimed in claim 1, in which said control switch means comprises a thyristors whose anode is connected to said anode terminal of said switch means, the cathode of said thyristor being connected to said cathode terminal of said switch means, and the gate of said thyristor being connected to said control input terminal of said switch means, said thyristor being connected in parallel with a resistor which is shunted by a series-RC circuit, said blocking capacitors between said primary windings of said pulse transformer being shunted by resistors.

* * * * *